United States Patent

[11] 3,604,006

| [72] | Inventor | William C. Rogers<br>5365 N.W. 36th St., Miami Springs, Fla. 33166 |
|---|---|---|
| [21] | Appl. No. | 782,825 |
| [22] | Filed | Dec. 11, 1968 |
| [45] | Patented | Sept. 7, 1971 |

[54] AIRCRAFT MOUNTED MAST FOR MULTIPLE ANTENNAE
8 Claims, 6 Drawing Figs.

[52] U.S. Cl. .................................................. 343/705, 343/727, 343/816, 343/887
[51] Int. Cl. ......................................................... H01q 1/28
[50] Field of Search........................................... 343/705, 708, 727, 809, 873, 816, 887

[56] References Cited
UNITED STATES PATENTS

| 2,495,748 | 1/1950 | Matson.......................... | 343/887 |
| 2,626,353 | 1/1953 | McGee.......................... | 343/873 |
| 2,921,307 | 1/1960 | Risk .............................. | 343/705 |
| 3,041,606 | 6/1962 | Berry et al. .................... | 343/727 |
| 3,210,764 | 10/1965 | Anderson et al.............. | 343/708 |

*Primary Examiner*—Eli Lieberman
*Attorney*—Burns, Doane, Swecker & Mathis

ABSTRACT: An antenna mast structure for combining communication, glide slope and omnidirectional localizer antenna functions without mutual interference in a small aerodynamic housing of a moldable material. Protection against accidental damage is afforded by a novel "deerhorn" construction.

INVENTOR
WILLIAM C. ROGERS

BY Burns, Doane, Benedict,
Swecker & Mathis

ATTORNEYS

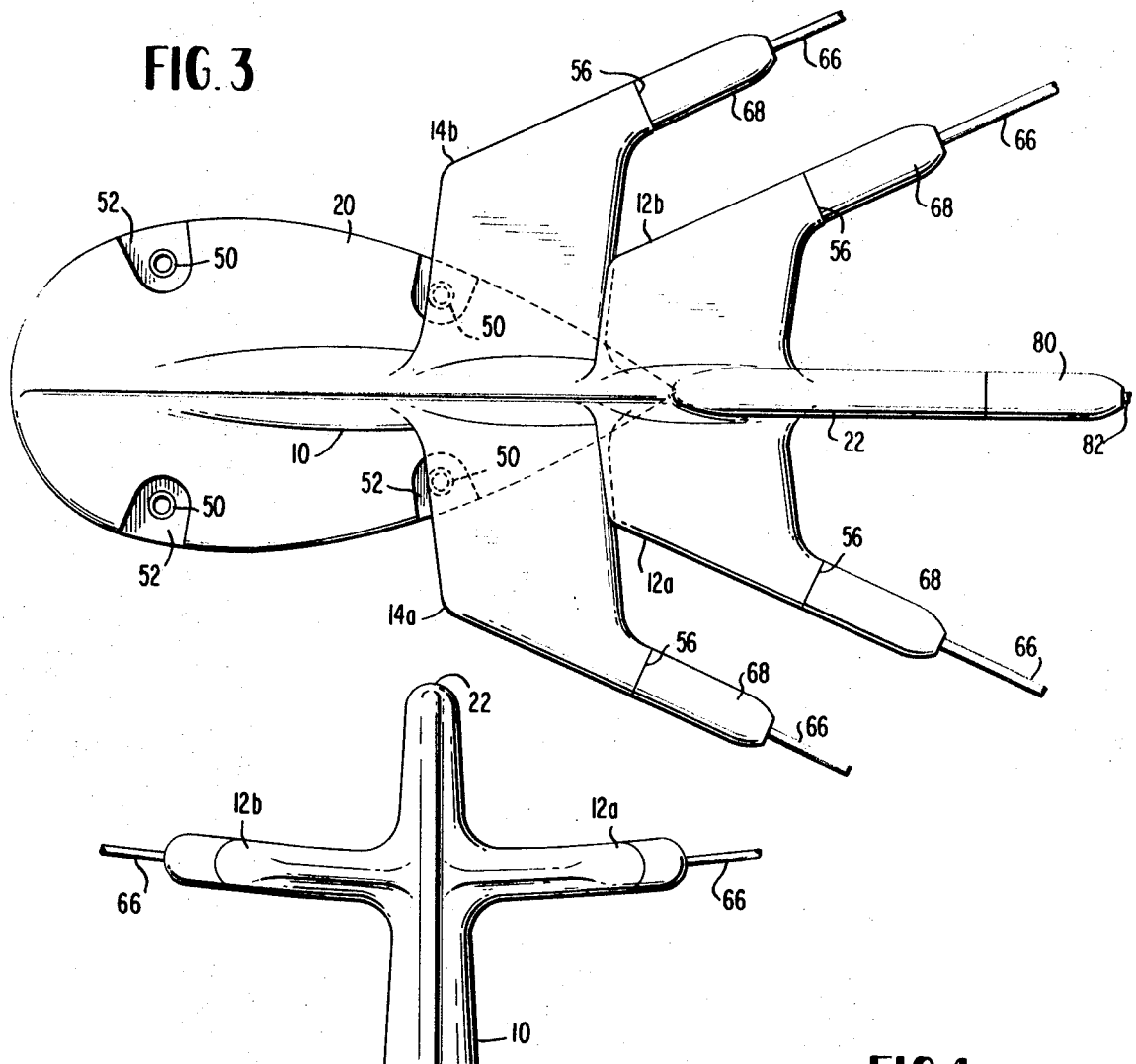
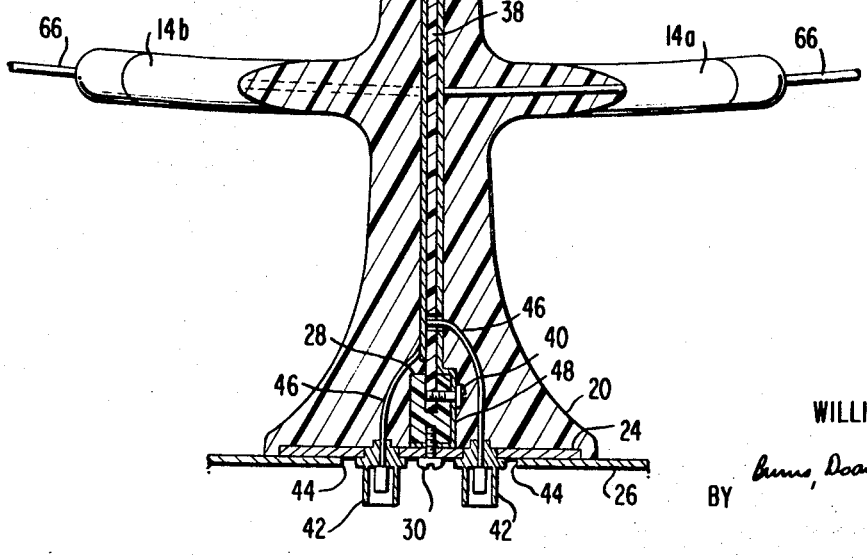

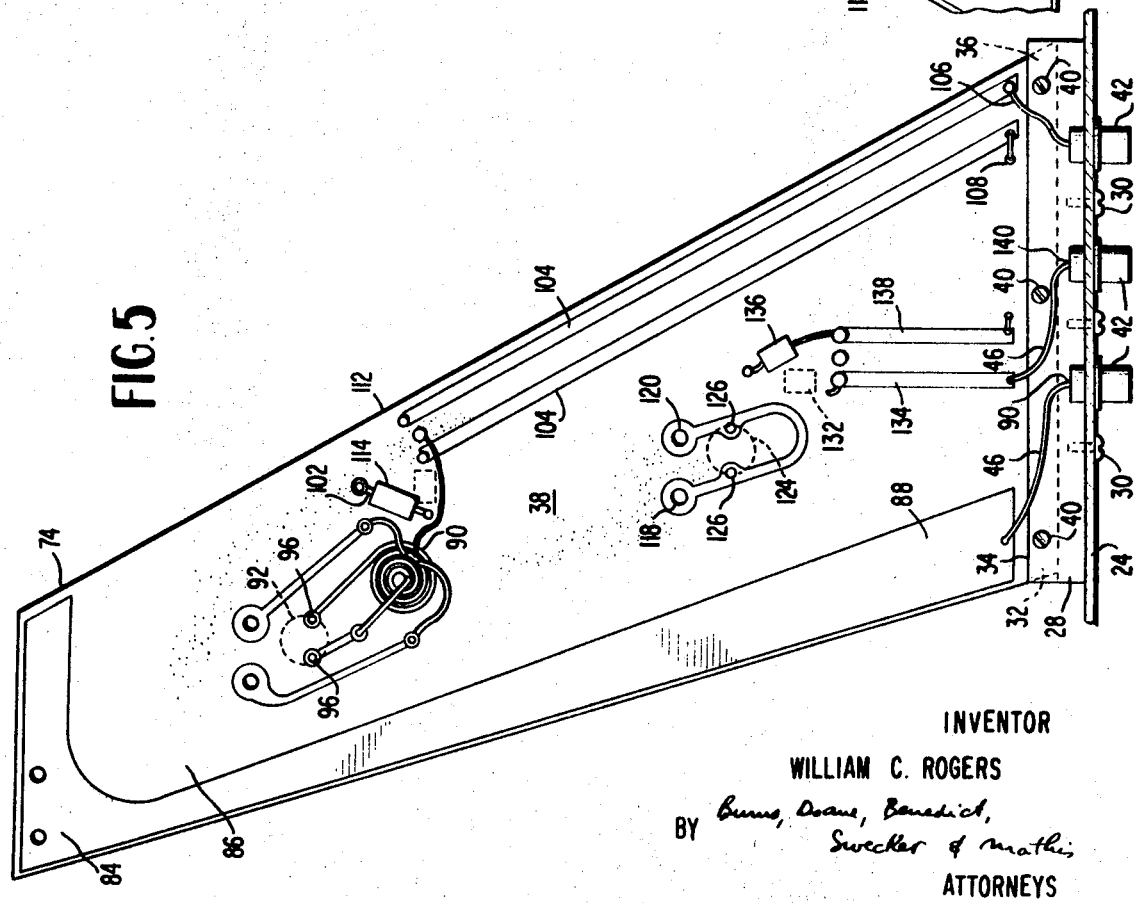

AIRCRAFT MOUNTED MAST FOR MULTIPLE ANTENNAE

BACKGROUND OF THE INVENTION

The number and types of radiofrequency navigation aids and communications equipment has multiplied in recent years. So too has the number of associated antennae which an aircraft is today expected to employ. The cluster of antennae which results is often unpleasing to the eye as well as aerodynamically detrimental to the handling of the aircraft, particularly on smaller aircraft.

A technique useful with large commercial aircraft having large surface areas has reduced these problems. In this technique, a portion of the aircraft having the requisite dimensions and fronting on the desired reception field is selected. Insulation and the antenna may then be applied to the selected portion and the antenna thus incorporated in the aircraft structure by embedding or thin film techniques.

Antenna length is, however, directly proportional to the wavelength of the energy to be transmitted or received. Smaller aircraft often do not have sufficient surface area fronting on the desired reception field for the employment of the embedded antenna technique described supra. As a result, the usefulness of this technique is generally limited to larger aircraft.

In attempting to incorporate a plurality of antennae in a single structure, the problem of aerodynamic packaging of the antenna to reduce drag is also more acute on smaller aircraft due to power limitations and weight considerations. Condensation of the necessary internal elements of the various antennae is required to produce an overall configuration having acceptable proportions. This condensation unfortunately leads to unwanted electrical coupling between the elements of the individual antennae.

It is accordingly primary object of the present invention to provide a novel antenna mast structure which incorporates and combines a plurality of antennae.

Another object of the present invention is to provide a plural antenna structure having an aerodynamic configuration which facilitates the use thereof on smaller aircraft without significant disturbance of the handling characteristics of the aircraft.

Still another object of the present invention is to provide a multiple antenna mast structure which is small in size, relatively inexpensive in construction, pleasing in appearance and easily mounted on the external surface of the aircraft.

Yet another object of the present invention is to provide a single mast structure having a plurality of antennae incorporated therein with a minimum of electrical interaction.

Array antenna are not generally known for their strength and are often inadvertent casualties in the servicing of the aircraft. Replacement of an entire antenna may be necessitated at a substantial expense.

Yet still another object of the present invention is thus to provide an antenna in which the electrical components are protected to a large degree from an inadvertent blow and in which the protruding antenna elements may be easily and inexpensively replaced.

These and other objects and advantages will be readily apparent from the following detailed description of a preferred embodiment when read in conjunction with the drawings.

THE DRAWINGS

FIG. 3 is a top plan view of the antenna mast of the present invention;

FIG. 4 is a section taken through lines 4—4 of FIG. 1;

FIGS. 5 and 6 illustrate the individual components of a preferred embodiment of the antennae within the mast of the present invention.

THE PREFERRED EMBODIMENT

Figure 1:
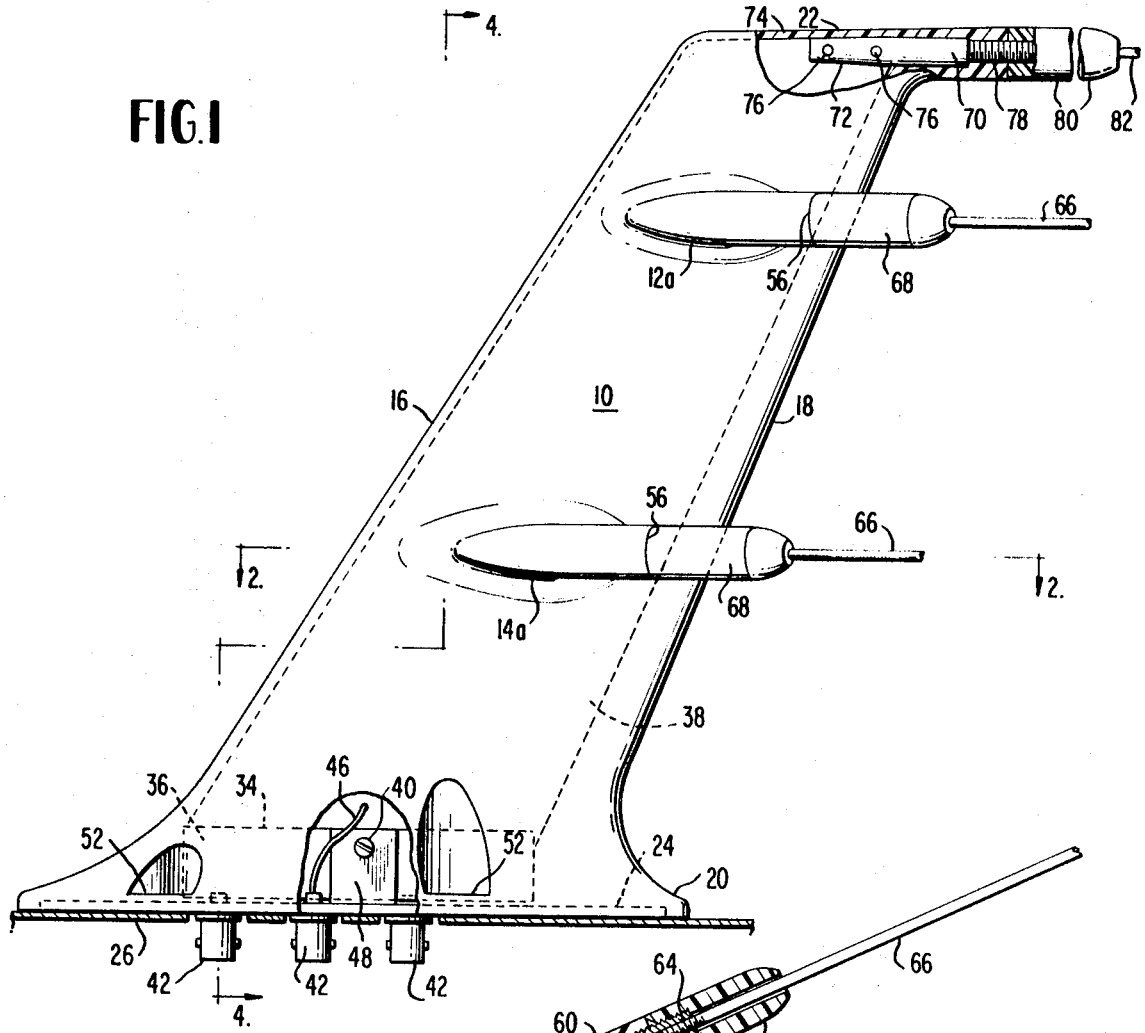
FIG. 1 is a side view of the antenna mast of the present invention with a portion of the top thereof broken away to show the VHF communication antenna termination structure and a portion of the lowermost section broken away to show the interconnection between the antennae and the base of the mast.
Figure 2:
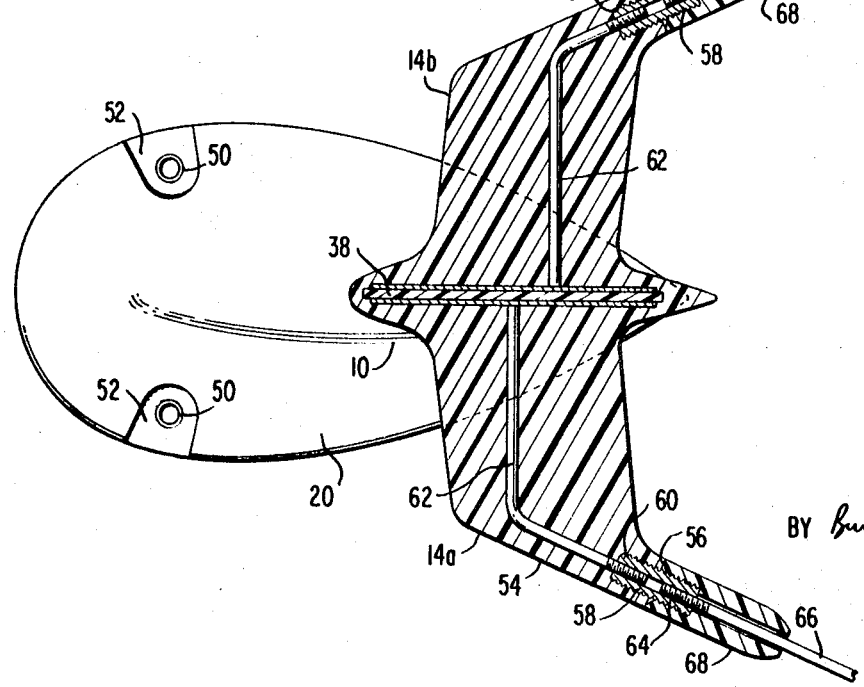
FIG. 2 is a section taken through lines 2—2 of FIG. 1 illustrating the omnidirectional localizer dipole and glide slope dipole terminations.

As seen in FIGS. 1, 2, and 4, the antenna of the present invention comprises an upstanding portion 10 and the base portions of two pairs of horns 12 and 14 which extend outwardly from opposite sides of the upstanding portion 10 in a direction substantially normal thereto. As seen in FIGS. 1 and 2, the upright portion 10 forms an airfoil in cross section over the entire vertical height. The upstanding portion 10 is swept back and the leading and trailing edges 16 and 18 thereof converge gradually from a wide base 20 to a narrow elongated upper portion 22.

The shape of the antenna mast is of course, determined by the material which encases the antenna elements hereinafter to be described. This material may be epoxy, fiberglass or other suitable moldable plastic which possesses the necessary insulative and shock-absorptive properties.

Referring now to FIGS. 1 and 4, the base 20 is provided with a metallic base plate 24 which is adapted to be mounted, in a manner subsequently to be described, directly on the metallic skin 26 of the aircraft. A mounting member 28, best seen in FIGS. 1 and 5, is secured along the longitudinal axis of the base plate 24 by means of a plurality of threaded fasteners 30 which extend upwardly through apertures in the baseplate 24 into threaded engagement with the mounting member 28.

The mounting member 28 may be substantially square in cross section and may be provided with a longitudinally extending slot 32 in the upper surface 34 thereof. The lower end 36 of a printed circuit board or blade 38 of an insulating material may be secured in the slot 32 of the mounting member 28 by means of a plurality of threaded fasteners 40 extending substantially parallel to the base plate 24 from one side of the mounting member 28 through the lower end 36 of printed circuit board 38 and into the mounting member 28 on the side thereof. The printed circuit board 38 may be equipped with various antenna components as desired and extends upwardly substantially throughout the vertical height of the antenna mast. The circuit board 38 and the antenna components thereon will be hereinafter described in greater detail in connection with FIGS. 5 and 6.

Referring again to FIGS. 1, 4 and 5, a plurality of conventional coaxial connectors 42 are mounted in proximity to the mounting member 28 along both sides thereof. As seen in FIG. 4, the coaxial connectors 42 extend downwardly through apertures 44 in the baseplate 24 and in the skin 26 of the aircraft when the antenna mast is installed. The center conductor of each of the coaxial connectors 42 is provided with a lead 46 which may be secured to the circuit components on the printed circuit board 28 in a conventional and well-known manner as by soldering. The specific number of coaxial connectors 42 and their connection to the circuit components of the preferred embodiment will be hereinafter described in more detail in connection with FIGS. 5 and 6.

The ground connection for the antenna circuits on the printed circuit board 28 may be provided, as indicated in FIG. 4, by an electrically conductive strap member 48 attached to the circuit and which extends downwardly along one side of the mounting member 28 and thereunder between the baseplate 24 and the mounting member 28. The threaded fasteners 30 which secure the mounting member 28 to the baseplate 24 thus pass through the conductive strap member 48 to provide a substantial area of electric contact between the member 48 and the baseplate 24 upon the securing of the mounting member 28 to the baseplate 24.

With reference to FIGS. 1 and 3, the antenna mast of the present invention may be secured to the skin 26 of the aircraft by means of four mounting screws 50 which extend downwardly through the base 20 of the upright portion 10 of the antenna mast. The airfoil configuration of the base portion 20 may be modified to provide a substantially horizontal upper surface 52 which may then be apertured to facilitate the threading of the mounting screws 50 into the skin 26 of the aircraft. The abutment of the baseplate 24 with the skin 26 of the aircraft is thus assured over an area substantially that of the baseplate 24. The electrical ground connection is thus established for the antenna components on the printed circuit board 38 through the conductive strap member 48 and the baseplate 24 to the skin 26 of the aircraft. This circuit is also completed through the baseplate 24 to the outer conductor of the coaxial connectors 42.

As best illustrated in FIGS. 2, 3 and 4, the horns 12 and 14 of the antenna mast are symmetrically disposed about the upstanding member 10. These horns 12 and 14 are wings having an airfoil vertical cross section and a slight positive dihedral. Due to the sweptback configuration of the upstanding portion 10, the uppermost horns 12a and 12b are rearwardly disposed with respect to the horns 14a and 14b located lower down the upstanding portion 10 of the antenna mast.

The horizontal difference in spacing between the rods 66 of the horns 12 and 14 and the upright portion 10 is not necessary but may be desirable. For this reason the widest horns 14 are disposed lower down the mast where the effects of air resistance will be less pronounced on aircraft control.

As shown in FIG. 2, each of the horns is provided at the outward extremity 54 thereof with a rearward and outwardly facing shoulder 56 into which is threaded a sleeve 58 of conducting material over about one-half the length thereof. Threaded into the forward end 60 of the conductive sleeve 58 is an electrical lead 62 which may be connected to the circuit on the printed circuit board 38 in a conventional manner. The sleeve 58 extends rearwardly and outwardly from the plane of the shoulder 56 in a direction substantially normal thereto and is threaded internally to receive at the rearward end 64 thereof an elongated rod 66 which forms the major part of the receiving portion of the antenna. The rods 66 may be faired into the horns 12 and 14 by means of insulating sleeve 68 which slide over the rods 66 to threadably engage the outer diameter of the sleeves 58. In this manner an electrical connection is established between the rod 66 and the circuit on the printed circuit board 38 by means of the sleeve 58 and the electrical lead 62.

The horns 12 and 14 perform a number of functions. A primary function is that of strengthening the upright portion 10 and providing rigidity for the leads 62 (see FIG. 2). Because of this novel construction, the application of force to one of the rods 66 may fracture the rod 66 but will not do so within the upright portion 10 of the mast where repair would be extremely difficult if not impossible from a practical standpoint. Should the rod 66 snap off within the sleeve 58, the sleeve 58 may itself be threadably removed from the wing or horns 12 and 14 and replaced.

The likelihood of damage to the electrical circuit components within the upright portion 10 is thus greatly reduced. Because the horns 12 and 14 are physically placed so as to ward off most inadvertent blows likely to occur in the servicing of the aircraft, and because the material, epoxy, fiberglass, etc., has inherent resiliency or shock absorbing characteristics, the force of a blow to one of the horns will not be directly transmitted to the components. As seen from the drawings, none of the circuit elements are physically located in the upright portion 10 directly between the horns.

Referring now to FIG. 1, the top of the printed circuit board 38 is provided with a rearwardly extending rod 70 of electrically conductive material. The rod 70 may be provided in the forward end 72 thereof with a vertical slit so as to receive the upper portion 74 of the printed circuit board 38 therebetween. The rod 70 may be secured to the upper portion 74 of the printed circuit board 38 by means of a plurality of threaded fasteners 76. The rearward end 78 of the rod 70 may be axially bored and both externally and internally threaded to form a sleeve. The sleeve 78 may thus be threaded to receive a fairing sleeve 80 of insulative material and a rearwardly extending electrically conductive rod 82, both connected in the manner described in connection with the rods 66 of the horns 12 and 14.

Referring now to FIGS. 5 and 6, the VHF communications antenna rod 82 of FIGS. 1 and 3 may be connected through the rod 70 to a plated conductor 84 which extends across the uppermost end 74 and down the right-hand side 86 of the printed circuit board 38. The extreme lower end 88 of the conductor may be connected to the center conductor 90 of one of the coaxial connectors 42 by means of a lead 46.

The received signal may be vertically polarized and the VHF communications antenna may serve both as a transmitting and receiving antenna. This antenna may be made to serve these dual functions by adding a conventional changeover relay to alternatively establish electrical connections with the transmitter or receiver (not shown). The antenna of the preferred embodiment illustrated is operable at a frequency of 118 to 136 mHz. at an impedance of approximately 50 ohms. At these frequencies the voltage standing ratio is better than 2:1.

The omnidirectional range and localizer dipole antenna of the illustrated embodiment utilize the uppermost horns 12a and 12b and the rods 66 connected thereto. The energy radiated by the ground station may be horizontally polarized and the physical length of the dipole antenna is, of course, dictated by the desired frequency range. The proximity to adjacent antennas, the height of the antennas above the aircraft structure, the physical distance between the dipole arms, and the angle between the arms, are all contributing factors to be considered. The omnidirectional range and localizer dipoles of the illustrated embodiment are electrically balanced across its physical length and the energy tapoff point is at the center thereof. A relatively high impedance coupling into an unbalanced load impedance transmission line is, of course, also desired.

A multiturn helix coil 90 is imprinted on the blade 38 at the points where the dipole sections are connected to the printed circuit board, i.e. the connection of the leads 62 to the circuit. The coil 90 is, as shown in FIG. 5, imprinted on the right-hand side 86 of the printed circuit board 83. A small high quality trimmer capacitor 92 on the left-hand side 94 may be connected across the outside turns of the helix coil 90 by leads 96 extending through the printed circuit board 38. By terminating the antenna dipoles on either side of the grounded electrical center of the printed helix coil 90, the relatively low impedance of the balanced dipole may be matched into the impedance of the helix coil 90 and variable trimmer capacitor 92 combination.

As seen from FIG. 6, the left-hand side 94 of the printed circuit board 38 is provided with a printed helix coil 98 located directly over the helix coil 90 on the right-hand side 86 thereof. This second helix coil 98 serves as the secondary winding of a transformer, of which the helix coil 90 serves as the primary winding. The transformer is utilized to obtain the impedance match with the unbalanced low impedance line.

As seen in FIG. 6, this secondary helix coil 98 is connected to segments 104 of the transmission line which extend down the right-hand side 86 of the printed circuit board 38 of FIG. 5 to the lower end 36 thereof. Leads 106 on the right-hand side 86 and lead 108 on the left-hand side 94 of the printed circuit board 38 are provided to the coaxial connectors 42 as indicated in the drawings.

The ground connection for the center top of the helix 98 is provided by a lead 111 and the printed circuit 110 which extends along the lower end 36 and up the forward end 112 of the left-hand side 94 of the printed circuit board 38. Capacitors 114 and 116 may be provided respectively on the right- and left-hand sides 86 and 94 of the printed circuit board 38 in the lead 102 from the helix coil 98 to the segments 104 of the transmission line.

The rods 66 of the horns 14a and 14b serve as the glide slope antenna dipoles. These rods 66 are connected by means of the leads 62 of FIG. 2 to the circuits on the printed circuit board 38. As seen in FIG. 5, the ends 118 and 120 of the leads 62 are connected by means of a horseshoe or C-shaped connector 122 printed on the right-hand side 86 of the printed circuit board 38. The connector 122 serves as the primary winding of a transformer as will be explained infra. A small high quality trimmer capacitor 124 may be physically located on the left-hand side 94 of the printed circuit board 38 as shown in FIG. 6 and may be connected through the printed circuit board 38 by leads 126 at an appropriate distance from the ends 118 and 120 of the leads 62.

As seen in FIG. 6, the left-hand side 94 of the printed circuit board 38 may be provided with a printed circuit multiturn helix coil 126. The coil 126 may be printed directly over the center of the horseshoe connector 122. This helix coil 126 serves as the secondary winding of a transformer providing an impedance match into the unbalanced low impedance transmission line. The center top of the helix coil 126 is directly connected by means of a lead 128 to an arm 130 of the printed circuit conductor 84 on the left-hand side 94 of the printed circuit board 38. The other end of the coil 126 is connected through a capacitor 132 on the left-hand side 94 of the printed circuit board 38 to one segment 134 of the transmission line and through a capacitor 136 on the right-hand side 86 to another segment of the transmission line. The extreme lower end 11 of the segment 134 of the transmission line is directly connected by means of a lead 96 to the center conductor 140 of one of the coaxial connectors 42. The extreme lower end of the segment 138 is similarly connected by means of a lead 142 to the center conductor of a coaxial connection 42 on the left-hand side of the mounting member 28 not shown in FIG. 6.

Electromagnetic isolation of the various antenna components is accomplished by utilization of folded wire turns 146 printed on the left-hand side 94 of the printed circuit board 38. As is well known, the folded wire turns cause magnetic cancellation and the series of turns 46 imprinted on the printed circuit board or blade 38 between the operating sections are dimensionally proportioned so that the physical length thereof will not allow a resonant condition to exist with the circuitry. Effective isolation of the operating sections and thus of the various antennas incorporated in the antenna mast of the present invention is thereby provided without deleterious capacitive effects.

The number of antenna circuits and thus the number of coaxial connectors and horns may, of course, be varied from that of the preferred embodiment illustrated without departing from the spirit and scope of the invention as defined, with a full range of equivalents, in the appended claims.

What is claimed is:

1. An antenna mast comprising:
    a housing having an upright portion and a base portion adapted to be secured to the skin of an aircraft;
    a plurality of electrical connectors carried by said base portion;
    a plurality of antenna circuits enclosed in said upright portion and electrically connected to one of said connectors;
    a plurality of vertically spaced elongated antenna elements projecting outwardly and rearwardly from opposite sides of the upright portion of said housing, one of the antenna elements on each side of the upright portion of said housing being electrically connected to the same one of said antenna circuits to form a dipole antenna;
    one of said antenna circuits including a helically wound transformer with a primary and secondary winding, the primary winding thereof connected to one of said connectors by a capacitor and the secondary winding thereof connected to said dipole antenna with a capacitor connected across said secondary winding; and
    means for electromagnetically isolating said antenna circuits within said housing, said means comprising folded wire turns physically proportioned to prevent resonance of said antenna circuit.

2. An antenna mast comprising:
    a housing having a upright portion and a base portion adapted to be secured to the skin of an aircraft,
    a plurality of electrical connectors carried by said base portion,
    a plurality of antenna circuits enclosed in said upright portion, each of said circuits electrically connected to one of said connectors and including impedance matching means,
    a plurality of pairs of vertically spaced elongated antenna elements, the antenna elements of each of said pairs projecting outwardly and rearwardly from opposite sides of the upright position of said housing and electrically connected to the same antenna circuit to form dipoles,
    an elongated antenna element extending rearwardly from the upper extremity of the upright portion of said housing and electrically connected to one of said connectors through one of said antenna circuit, and
    means for electromagnetically isolating said antenna circuits within said housing.

3. The antenna mast of claim 2 wherein the upright portion of said housing is an airfoil in cross section and includes a plurality of wing portions extending substantially normal thereto, each of said antenna elements being electrically connected to one of said antenna circuits through an electrical connector in one of said wings.

4. The antenna mast of claim 3 wherein said means for electromagnetically isolating said antenna circuits include a plurality of folded turns of an electrically conducting material, said folded turns being dimensionally proportioned to prevent the resonance of said antenna circuits, wherein said elongated antenna element extending rearwardly from the upper extremity of the upright portion of the housing is directly connected to one of the said connectors to form a VHF communications antenna, wherein a first pair of said dipoles are connected to one of said antenna circuits to function as an omnidirectional localizer antenna, and wherein a second pair of said dipoles are connected to another one of said antenna circuits to function as a glide slope antenna.

5. An aircraft antenna comprising:
    an electrically conducting baseplate adapted to be secured to the skin of an aircraft;
    an electrically insulative mounting member carried by said baseplate;
    an electrically insulative blade secured to said mounting member;
    a plurality of electrical circuits mounted on said blade;
    an electrically insulative airfoil housing encasing said mounting member, said blade, the electrical circuits carried by said blade, a portion of each of said elongated antenna elements and a portion of said baseplate;
    means for electromagnetically isolating said antenna circuits within said housing comprising folded wire turns physically proportioned to prevent resonance of said antenna circuit;
    a plurality of coaxial connectors carried by said baseplate, the outer conductor of each of said connectors being electrically connected to said baseplate;
    means electrically connecting each of said antenna circuits to the inner conductor of one of said connectors;
    a plurality of vertically spaced elongated antenna elements electrically connected in pairs to form dipoles, each of said pairs being connected to one of said antenna circuits,
    an elongated antenna element extending rearwardly from the upper extremity of the upright portion of said housing, said rearwardly extending antenna element being electrically connected through one of said antenna circuits to one of said connectors; and
    one of said antenna circuits including a helically wound transformer with a primary and secondary winding, the primary winding thereof connected to one of said connectors by a capacitor and connected to another of said connectors by another capacitor and the secondary winding thereof connected to said dipole antenna with a capacitor connected across said secondary winding.

6. An aircraft antenna mast comprising:
    an aerodynamic housing adapted to be secured to an aircraft;

a communications antenna element extending rearwardly from the upper extremity of said housing;

a first pair of dipoles extending rearwardly and outwardly from opposite sides of said housing;

a second pair of dipoles extending rearwardly and outwardly from said housing on opposite sides thereof, said communication antenna and said pairs of dipoles being vertically spaced from each other;

connector means carried by said housing; and circuit means electrically connecting said communication antenna and each of said pairs of dipoles to said connector means, said circuit means including means for electromagnetically decoupling said communication antenna and said pairs of dipoles from each other.

7. The antenna of claim 6 wherein said housing includes wings extending from opposite sides thereof and wherein each of said dipoles is connected to said circuit means through one of said wings, one of said pairs of dipoles is adapted for use as an omnidirectional localizer antenna, and wherein the other of said pairs of dipoles is adapted for use as a glide slope antenna.

8. The antenna of claim 7 wherein said wings are comprised of a shock-absorbing material to thereby protect said circuit means from inadvertent damage, and wherein said decoupling means includes a plurality of folded wire turns electrically connected to the skin of the aircraft on which the antenna is mounted.